(12) United States Patent
Jones et al.

(10) Patent No.: US 6,744,880 B1
(45) Date of Patent: Jun. 1, 2004

(54) METHOD FOR CREATING A TELEPHONE DIGITAL SWITCHING PLATFORM

(75) Inventors: John P. Jones, St. Louis, MO (US); George E. Meyer, St. Louis County, MO (US)

(73) Assignee: Telescan Corporation, St. Louis, MO (US)

( * ) Notice: Subject to any disclaimer, the term of this patent is extended or adjusted under 35 U.S.C. 154(b) by 0 days.

(21) Appl. No.: 09/484,296

(22) Filed: Jan. 18, 2000

(51) Int. Cl.[7] .............................. H04J 3/12; H04M 3/00; H04M 7/00
(52) U.S. Cl. ..................... 379/268; 370/467; 370/524; 379/229; 379/230; 379/233; 379/234; 379/235; 379/237
(58) Field of Search ................... 370/364, 524, 370/467, 522; 379/214.01, 218.01, 225, 242, 258, 268, 229, 230, 231, 232, 233, 234, 235, 236, 237

(56) References Cited

U.S. PATENT DOCUMENTS

| | | | | |
|---|---|---|---|---|
| 4,916,726 A | * | 4/1990 | Morley et al. | 379/88.13 |
| 5,113,429 A | * | 5/1992 | Morley et al. | 379/88.13 |
| 5,420,852 A | | 5/1995 | Anderson et al. | 379/214.01 X |
| 5,649,005 A | * | 7/1997 | Lynch et al. | 379/242 |
| 5,715,307 A | * | 2/1998 | Zazzera | 379/265.03 |
| 5,719,855 A | | 2/1998 | Ando et al. | 370/280 |
| 5,875,234 A | * | 2/1999 | Clayton et al. | 379/93.05 |

\* cited by examiner

*Primary Examiner*—Harry S. Hong
(74) *Attorney, Agent, or Firm*—Paul M. Denk

(57) ABSTRACT

A method for creating a telephone digital switching platform to provide conversion and routing of telephone calls arriving on a number of telephony interfaces to a number of outbound telephony interfaces, based on in parameter and out of parameter call setup information. Receiving and transmitting interfaces can include, but are not limited to, Integrated Services Digital Network ("ISDN"), Digital Transmission Carrier System ("T-1"), DID ("Direct Inward Dial"), Loop Start, ("E & M") and Direct Outward Dial ("DOD"). Conversion and routing is performed by the steps of capture of call setup information, conversion to "dial number" via database lookup, selection of outbound pathway based on database information, and placement of outbound call and switched connection to inbound call.

22 Claims, 5 Drawing Sheets

METHOD FOR CREATING A TELEPHONE DIGITAL SWITCHING PLATFORM

CROSS-REFERENCE TO RELATED APPLICATIONS

None.

STATEMENT REGARDING FEDERALLY SPONSORED RESEARCH OR DEVELOPMENT

Not Applicable.

BACKGROUND OF THE INVENTION

The present invention relates generally to a method for creating a telephone digital switching platform and, more particularly, to a method for creating a telephone switching platform which provides for interfacing and computer controlled switching of both inbound and outbound telephone calls, consisting of various telephonic signal styles including Integrated Services Digital Network ("ISDN") signals, Digital Transmission Carrier System ("T-1") signals, Direct Inward Dialing ("DID") signals, E&M, and Loop Start signals, while maintaining specific account information about each of the calls routed by the telephone digital switching platform.

There is presently a very large installed base of Private Branch Exchange ("PBX") and similar equipment that cannot be connected to digital telephone services. There is also a large base of customer owned telephone equipment that cannot utilize certain telephone company services. As a result of this incompatibility, owners of older style PBX systems or non-digital telephone equipment are faced with the need to totally replace their entire telephone systems if they wish to make use of the currently available digital telephone technology. Additionally, if these current telephone equipment owners choose to continue to rely on their currently outdated equipment, they will have access to only the poorer audio quality provided by older analog telephonic signal technology.

Many current owners of older analog telephone switching systems are Telephone Answering Services ("TAS") which act as telephone receptionists, pagers, and message takers for smaller business operations. As a function of the TAS business, it is important to create a method by which information for each call and each TAS customer, including each customer's preferences, can be stored within a computer system database. While some current PBX systems are now integrated with a computer system to generate this type of database information, those systems do not have the capability of converting the telephone signals into digital signals to take advantage of the digital telephone services of their local telephone service supplier. Additionally, these same current PBX systems cannot maintain a computerized method of generating a TAS computerized customer database capable of identifying the desire of the customer to convert particular types of telephonic signals or to track the calls which have been received, sent, and/or converted based upon the TAS customer's preference for such conversions.

Although some equipment exists to provide the limited conversion of telephonic signals and for the creation of customer oriented databases for call information, these systems are usually very inflexible and relatively inefficient. Once installed these same systems are also difficult to reconfigure and do not provide a user-friendly interface. Therefore, the users of such systems encounter difficulty in customer account set-up, port configuration, and system monitoring.

The present invention overcomes these and other problems by providing a method for detecting and categorizing the type of telephonic signal received by the switching platform and converting those calls to match the type of PBX and telephone equipment currently in operation by the user. The present invention provides a flexible interface between any current telephone services available from the local servicing telephone company and this older equipment. Of particular note is the ability of the invention to provide direct conversion of primary rate ISDN voice calls to analog DID within a single device. Prior to this, a number of series connected devices were required.

The present invention also provides simple equipment setup which uses off-the-shelf computer components and telephonic interface control devices. Additionally, the algorithms of the present invention allow for generation of computer software capable of functioning on a Windows NT®, Unix®, or Linux® operating system. These algorithms dictate the methodology for achieving the switching and routing accomplished by the present invention to achieve all of the above delineated effects. These algorithms identify the type of call received and how the call is treated after comparison of that call's characteristics to on board customer database information.

This invention also consists in the parts and in the arrangements and combinations of parts hereinafter described and claimed.

SUMMARY OF THE INVENTION

Therefore, the present invention resides in a method for creating a telephone digital switching system which uses a digital computer system equipped with telephonic control devices installed in said computer, and algorithms written in a computer system language compatible with a Windows NT®, Unix®, or Linux® based operating system installed in said computer to provide both physical and logical conversion and routing of received telephone calls. Inbound and outbound trunks are grouped by interface type and/or logical function and are controlled by the system administrator program operating in conjunction with a combination of configuration files and interactive input. Based on the type of inbound interface, call setup information is used to derive an index value account used for lookup of the current call. The information stored in the database record for the account includes dial number translation data for two outbound trunk groups. Selection between the primary and secondary dial group is based on time of day, channel availability, caller input (DTMF tone detect) and response to outbound call attempt.

It is an object of the invention to provide a method to convert any type of incoming telephonic signal to any type of currently used outgoing signaling format. Line interfaces can be any combination of ISDN; T-1, DID E&M and/or Loop Start lines with port extensions up to 2,000 ports.

It is another object of the invention to provide a digital telephone switching system which can be used to upgrade any older PBX or TAS system to less expensive ISDN service.

It is also an object of the invention to provide a method of routing any telephone number, using a user programmable interface, to an unlimited number of telephone systems by account number, DID, DNIS, time of day, input from caller, or real-time call activity such as no answer or busy.

It is yet another object of the invention to provide a method of setting up customer accounts, port configurations and system monitoring, and the other above described capabilities by utilizing a user-friendly administrative interface.

Other objects and features of the present invention will be in part apparent and in part pointed out hereinafter.

DETAILED DESCRIPTION OF THE INVENTION

Figure 1:
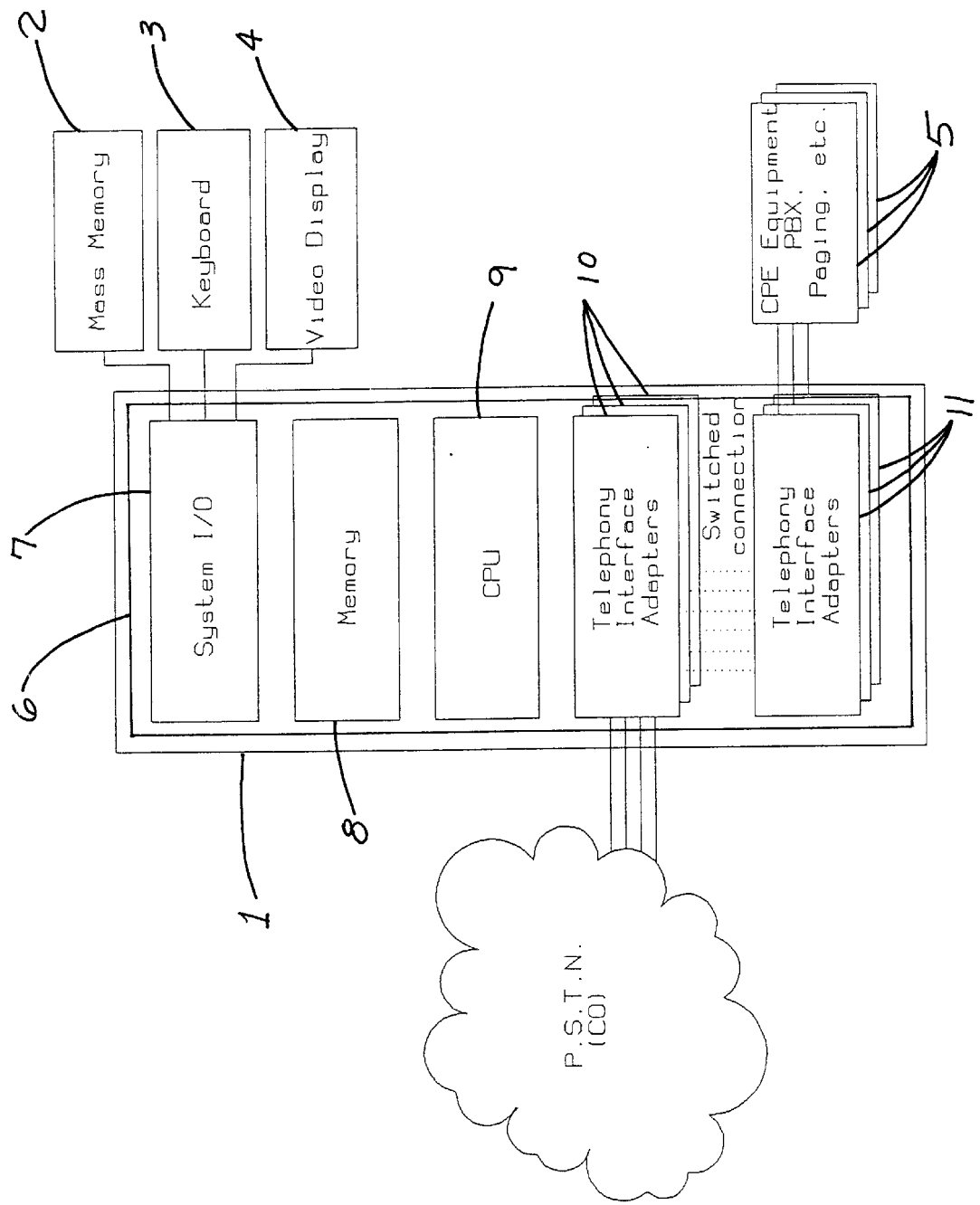
FIG. 1 illustrates a computer system incorporating the current invention. Although the drawing implies that central office and customer premises connection are isolated on different adapters, this is not required.

Referring now to the drawings it can be seen that by combining the variety of available telephonic control devices for use with computer systems using the Intel® family of microprocessors (or compatible) and a flexible control program, a unique application has been developed.
Platform:

Referring to FIG. 1, a computer system (1) is equipped with external components and internal components. The external components include a device for mass memory storage (2), a keyboard (3), a video display monitor (4), and any existing PBX or customer owned telephone equipment (5). The internal components consists of a computer motherboard (6) on which are installed a system I/O interface (7), on board RAM memory (8), an Intel Pentium® (or equivalent) central processing unit ("CPU") (9), various telephonic interface control devices for at least one incoming telephone signal (10), and various other telephonic interface control devices for outgoing telephonic signals (11).

The application has been implemented using the Microsoft Windows NT® operating system and a number of ISA or PCI telephonic interface control devices. The telephonic interface control devices are chosen to match the interface requirements for each user's specific installation. If more than one card is used in a system, a standard MVIP or H.100 (or compatible) switching matrix connection is required on each.
Program:

The computer program forming the heart of the present invention incorporates a specific scheme of algorithms that, together, provide the method of achieving the objects of the present invention. The algorithm's modules for the digital telephone switching platform are depicted in the flow charts shown in FIG. 2, FIG. 3, FIG. 4 and FIG. 5. The operating methodology for these algorithms modules are described in the following paragraphs.

Figure 2:
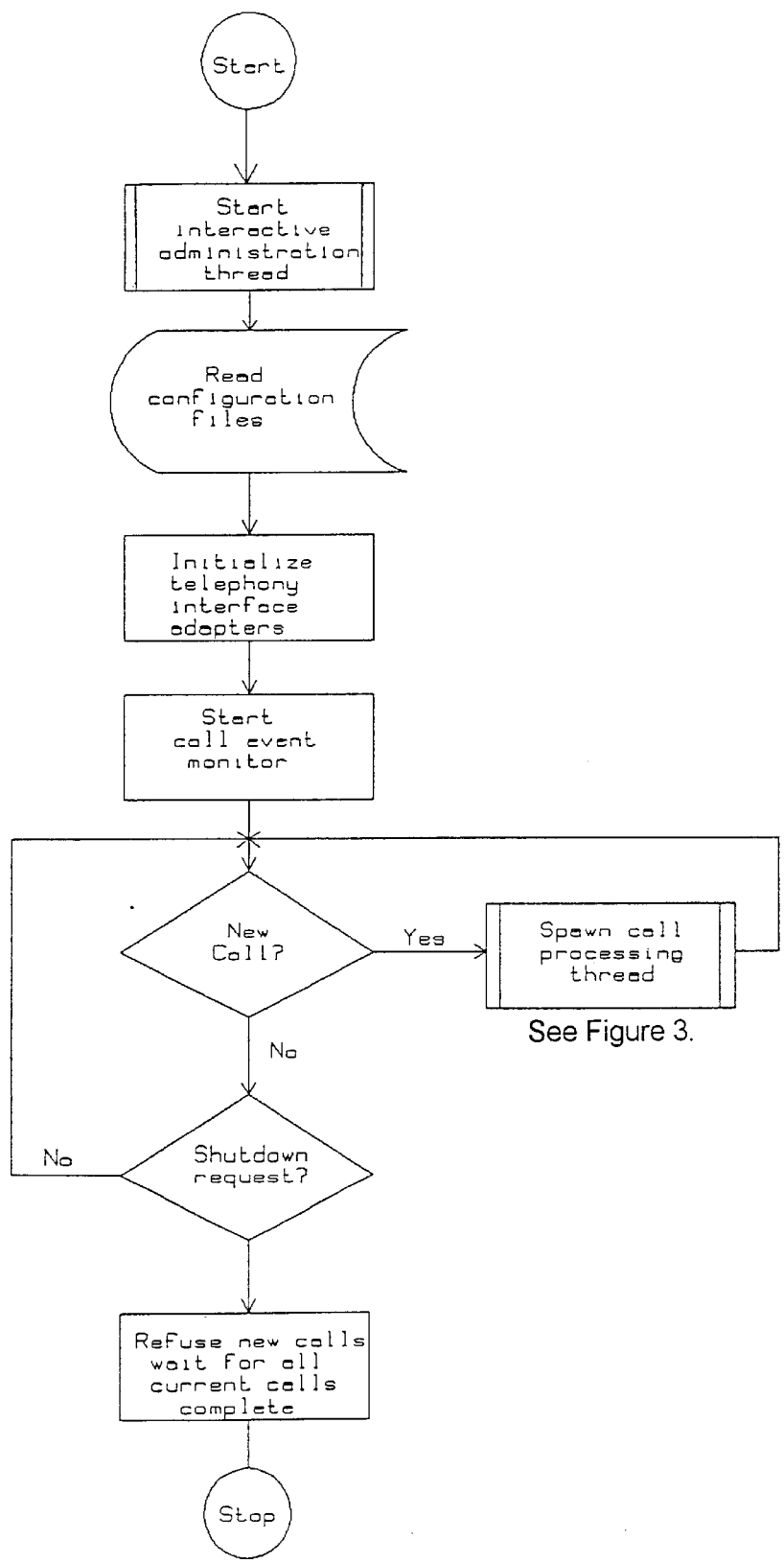
FIG. 2 illustrates the basic program flow for the software component of the invention.

Referring now to FIG. 2, on startup, the control program algorithm reads all configuration files and initializes all channels on all adapters for required functionality. Depending on the capabilities of the telephonic control devices and the requirements of the installation, individual channels are assigned to be inbound channels, outbound channels, or bi-directional use.

Figure 3:
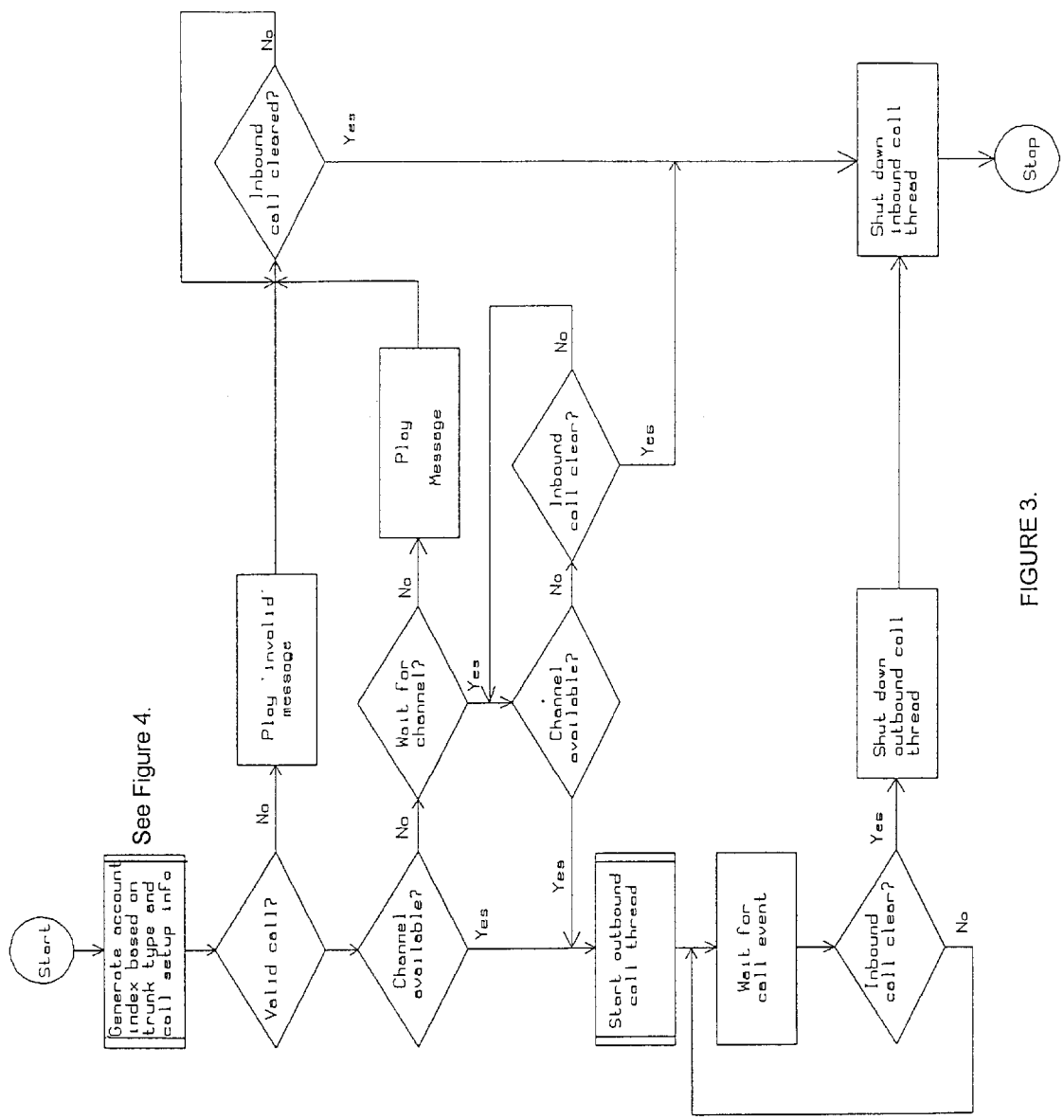
FIG. 3 illustrates the program flow used for processing each inbound call.
Figure 4:
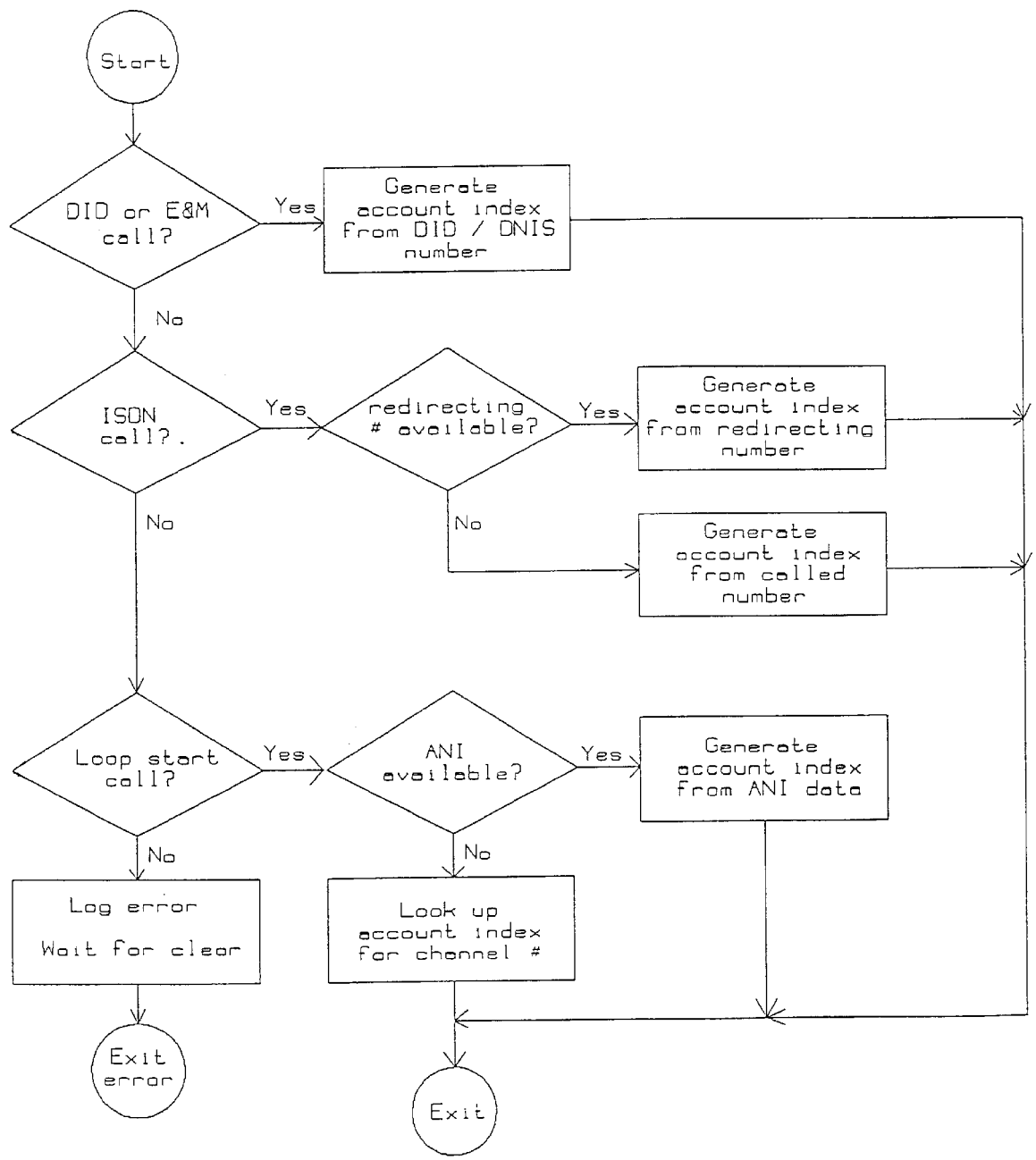
FIG. 4 illustrates the method for generating a unique account index for each call. This index is used for account database access.

The control program algorithm monitors all inbound channels for call activity as indicated by any incoming telephonic signal. As shown in FIG. 2, upon detection of an inbound call, the call processing thread as shown in FIG. 3 is spawned and the program generates an account index based on the type of telephonic signal present as shown in FIG. 4. The account index is based on the incoming telephonic signal type using the criteria shown in FIG. 4 as follows:
If incoming call signal is:
   ISDN: If available use the "redirecting" number, otherwise use the "called" number provided in the call setup message.
   DID: Use the DID or DNIS number provided in band.
   Loop Start: Use a number assigned to the line, or if available use ANI data.

Returning now to FIG. 3, after generation and validation of the account number, an attempt is made to place allocate an outbound channel. If no outbound channel is available in the primary outdial group, the outdial group configuration is used to determine which of the following actions should be taken.
   1. Attempt an outbound call on the alternate outdial group.
   2. Return busy signal to the inbound call.
   3. Play a voice message to the inbound caller.
   4. Play audible ring to inbound caller while waiting for an outdial channel.

If an outbound channel is available, an outbound call thread is activated. The outbound call thread initiates an outboard call on the allocated channel and monitors for answer of said channel. When such answer is detected, the inbound and outbound channels are connected and remain so until either channel clears. If enabled by the customer account information, the call can be monitored for DTMF and if the proper tone pair is detected, an attempt will be made to place a call in the alternate group and connect to it. If an answer time is programmed for this customer account, and the outbound call is not answered in that time, an attempt will be made to place and connect in the alternate outdial group.

Figure 5:
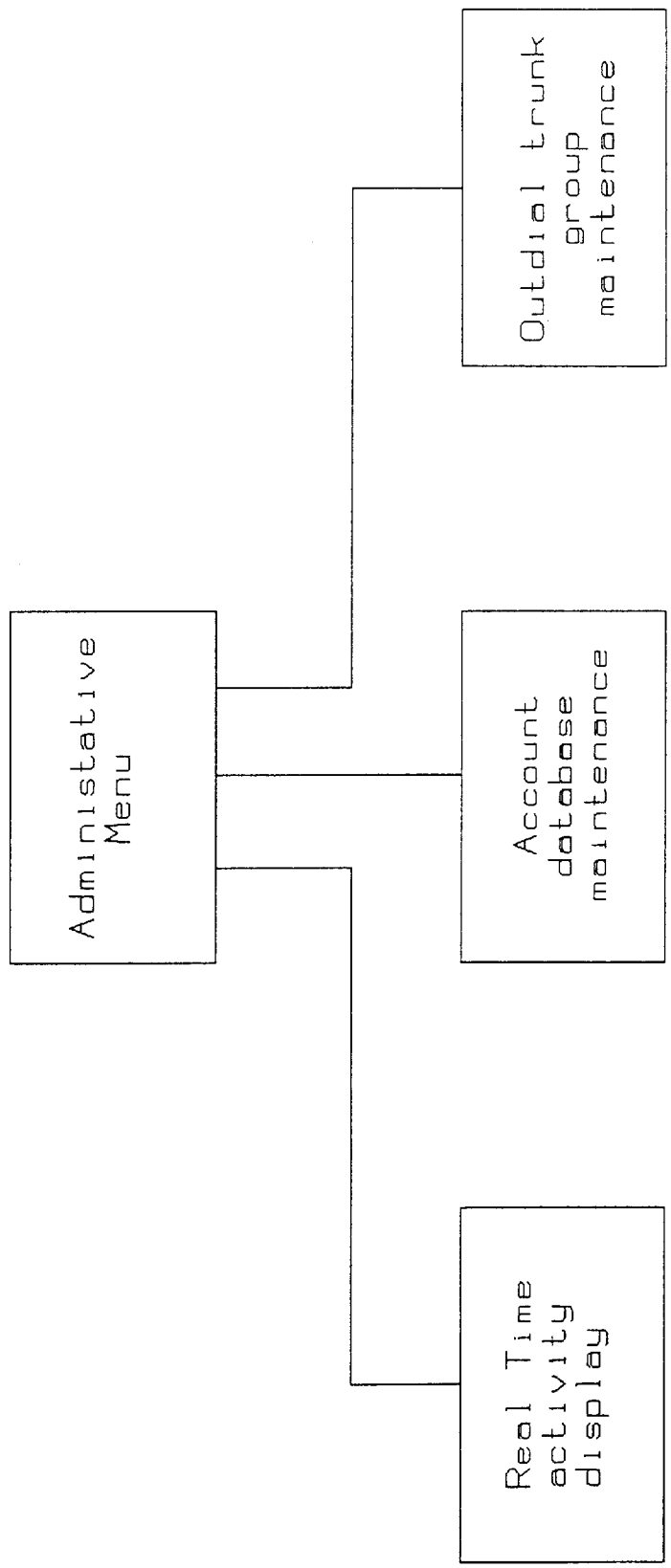
FIG. 5 illustrates the relationships among the several interactive administrative functions which are part of the current invention.

The Administrative Program Menu shown in FIG. 5 controls the characteristics of each outdial group which can be programmed interactively. When outdial channels are assigned to each group, the channel takes on that group's characteristics. These characteristics include:
   1. Channel selection algorithm within the available channels, possible selections are: sequential ascending, sequential descending, circular ascending, circular descending and longest idle.
   2. Dial string prefix and suffix, useful for in band control of target devices such as paging terminals and voice mail.
   3. Type of outdial number, Direct Inward Dialing ("DID")/Dial Number Identification Service ("DNIS") or Plain Old Telephone Service ("POTS") style.
   4. Action taken if all channels are busy, detailed above.

The characteristics of each customer account information are programmed interactively. Within this interaction, the following can be specified for each customer account:
   1. Primary and secondary outdial group identification.
   2. Dial number translations for primary and secondary pathways.
   3. Time of day primary and secondary are to be used.
   4. Dual Tone Multi-frequency ("DTMF") transfer tone.
   5. Time to wait for answer.

Throughout the entire switching process, statistical information is collected during the course of each inbound or outbound call, and written to the computer system's mass storage memory as each is completed. Included in this detailed account record are the inbound and/or outbound dial number, start and end times, duration of ring and connect, and in some cases additional setup information.

Referring again to FIG. 3, when the program detects a clearing of the incoming telephonic signal, the program shuts down the outbound call processing thread and the inbound call processing thread. This switching process operates continuously until the computer system is shut down.

Variations or modifications to the subject matter of this invention may occur to those skilled in the art upon reviewing the invention described herein. Such variations or modifications, to this disclosure, are intended to be encompassed within the scope of this invention as provided and disclosed herein.

What is claimed is:

1. A method for creating a digital switching platform comprising:
    assembling a computer system which incorporates various telephonic interface control devices;
    detecting by said computer system of at least one incoming telephonic signal of a first signal type;
    converting said at least one incoming telephonic signal of a first signal type into an outgoing telephonic signal of a second telephonic signal type, the first signal type being any one of an analog or a digital signal, and the second telephonic signal type being any one of a digital, ISDN, T-1, DID, E&M or Loop Start signal, or any combination thereof;
    switching said outgoing signal of a second signal type between various inbound and/or outbound communication channels of the said telephonic control devices;
    controlling said detecting, converting, and switching to be in conformance with individualized customer account instructions used by said computer system;
    monitoring by said computer system of said detecting, converting, and switching to obtain statistical information about the treatment of said at least one incoming telephonic signal of a first signal type;
    storing said statistical information; and
    displaying said statistical information.

2. The process according to claim 1 wherein the said at least one incoming telephonic signal is converted to an ISDN, T-1, DID, E&M and/or Loop Start second telephonic signal type.

3. The process according to claim 1 wherein said telephonic interface control devices are capable of receiving incoming telephonic signals and/or transmitting outgoing telephonic signals using inbound channels, outbound channels, or bi-directional channels within said telephonic interface control devices.

4. The process according to claim 1 wherein said computer system functions on a Windows NT®, Unix®), or Linux© based computer operating system.

5. The process according to claim 1 wherein said computer system generates at least one primary outdial group and at least one secondary outdial group wherein said primary and secondary outdial groups contain specific characteristics regarding channel selection, signal switching, signal conversion, and actions to take if all said inbound or outbound channels are busy.

6. The process according to claim 1 wherein said computer system allows for selection between the primary and secondary dial group based on time of day, channel availability, caller input (DTMF tone detect), and /or response to an outbound call attempt.

7. The process according to claim 1 wherein said computer system controls the characteristics of each said outdial group.

8. The process according to claim 7 wherein said computer system provides for each said outdial group to be programmed interactively.

9. The process according to claim 7 wherein the said characteristics of each said outdial group include a channel selection based upon sequential ascending, sequential descending, circular ascending, circular descending, or longest idle order of selection.

10. The process according to claim 7 wherein the said characteristics of each said outdial group include dial string prefixes and suffixes for use in the in band control of target devices such as paging terminals and voice mail.

11. The process according to claim 7 wherein the said characteristics of each said outdial group include type of outdial number such as DID, DNIS or POTS style signals.

12. The process according to claim 7 wherein the said characteristics of each said outdial group include what action is to be taken if all said inbound and outbound channels are busy.

13. The process according to claim 1 wherein said computer system creates a customer database within said computer system, said customer database containing customer account information from telephone customers regarding customer's telephone number and the switching, routing, selection of said inbound channel, selection of said outbound channels or converting of said at least one incoming telephonic signal, said switching, routing, or converting of said at least one incoming telephonic signal being predicated upon the said customer telephone number to which the said at least one incoming telephonic signal is directed.

14. The process according to claim 13 where said customer account information is programmed interactively.

15. The process according to claim 13 where said customer account information includes information regarding primary and secondary outdial group identification, dial number translations for primary and secondary pathways, time of day primary outdial group and secondary outdial group to be used, DTMF transfer tone, and time to wait for an answer.

16. The process according to claim 1 wherein said computer system is capable of maintaining said customer account information within said customer database to match the changing preferences of said telephone customers.

17. The process according to claim 1 where said computer system correlates said customer telephone number to said telephone customers to establish a unique account designation within said computer system for each said customer telephone number.

18. The process according to claim 1 wherein said telephonic interface control devices are capable of detecting the cessation of the said at least one incoming telephonic signal on either said inbound channels or said outbound channels.

19. A process for creating a digital switching platform comprising:
    assembling a computer system which incorporates various telephonic interface control devices for conversion of at least one incoming telephonic signal of a first signal type into a second telephonic signal of a second telephonic signal type, said telephonic interface control devices being capable of receiving incoming telephonic signals and/or transmitting outgoing telephonic signals using inbound channels, outbound channels, or bi-directional channels within said telephonic interface control devices, said computer system functioning on a Windows NT®), Unix®, or Linux® based computer operating system, the first signal type being any one of an analog or a digital signal, and the second telephonic signal type being any one of a digital, ISDN, T-1, DID, E&M or Loon Start signal, or any combination thereof;

creating a customer database within said computer system, said customer database containing customer account information from telephone customers regarding customer's telephone number and the switching, routing, selection of said inbound channel, selection of said outbound channels or converting of said least one incoming telephonic signal, said switching, routing, or converting of said at least one incoming telephonic signal being predicated upon the said customer telephone number to which the said at least one incoming telephonic signal is directed;

maintaining said customer account information within said customer database to match the changing preferences of said telephone customers;

correlating said customer telephone number to said telephone customers to establish a unique account designation within said computer system for each said customer telephone number;

monitoring the sequence of events taking place within the digital switching platform to create customer account information as the said at least one incoming telephonic signal is switched and routed within the said digital switching platform;

displaying said customer account information as requested by the operator of the said digital switching platform;

storing said customer account information within said computer system to enable said computer system to display or print said customer information;

generating at least one primary outdial group and at least one secondary outdial group wherein said primary and secondary outdial groups contain specific characteristics regarding channel selection, signal switching, signal conversion, and actions to take if all said inbound or outbound channels are busy;

detecting the presence of said at least one incoming telephonic signal by said telephonic interface control devices within said computer system; identifying the said at least one incoming telephonic signal type by said telephonic interface control devices and creating an account index containing the information about the said at least one incoming telephonic signal;

converting of said at least one incoming telephonic signal into a second telephonic signal of a second telephonic signal type as specified in said customer database information;

switching said second telephonic signal to match said outbound channel specifications defined within said customer account information; detecting the cessation of the said at least one incoming telephonic signal on either said inbound channels or said outbound channels; and clearing of said inbound channels or outbound channels upon detection of cessation of said at least one incoming telephonic signal.

20. The process according to claim 19 where the said at least one incoming telephonic signal is converted to an ISDN, T-1, DID, E&M and/or Loop Start telephonic signal type.

21. The process according to claim 19 where said customer account information is programmed interactively.

22. The process according to claim 19 wherein said customer account information can be programmed to contain characteristics regarding primary and secondary outdial group identification, dial number transitions for primary and secondary pathways, time of day primary and secondary are to be used. Dual Tone Multi-frequency ("DTMK") transfer tone, and time to wait for answer.

* * * * *